United States Patent [19]
Gulli

[11] Patent Number: 5,500,903
[45] Date of Patent: Mar. 19, 1996

[54] METHOD FOR VECTORIAL NOISE-REDUCTION IN SPEECH, AND IMPLEMENTATION DEVICE

[75] Inventor: Christian Gulli, St Medard en Jalles, France

[73] Assignee: Sextant Avionique, Meudon la Foret, France

[21] Appl. No.: 174,420

[22] Filed: Dec. 28, 1993

[30] Foreign Application Priority Data

Dec. 30, 1992 [FR] France ................................. 92 15904

[51] Int. Cl.⁶ .................................................... H04R 3/00
[52] U.S. Cl. ............................................................ 381/92
[58] Field of Search ............................... 381/71, 94, 68.4, 381/68.2, 92

[56] References Cited

U.S. PATENT DOCUMENTS

| | | | |
|---|---|---|---|
| 4,363,112 | 12/1982 | Widrow | 367/30 |
| 4,589,137 | 5/1986 | Miller | 381/94 |
| 5,058,081 | 10/1991 | Gulli | 367/123 |

OTHER PUBLICATIONS

Joseph Lardies, et al., Proceedings of Eusipco—88 Fourth European Signal Processing Conference, vol. 1, 5, Sep. 1988, pp. 299–302, "Localization of Radiating Sources by an Array of Sensors." Harvey F. Silverman, et al., Computer Speech and Language, vol. 6, No. 2, Apr. 1992, pp. 129–152, "A Two–Stage Algorithm for Determining Talker Location from Linear Microphone Array Data." Lloyd J Griffiths, et al., IEEE Transactions On Antennas and Propagation, vol. AP–30, No. 1, Jan. 1982, pp. 27–34, "An Alternative Approach to Linearly Constrained Adaptive Beamforming." Dirk Van Compernolle, Speech Communication, vol. 9, No. 5/6, Dec. 1990, pp. 433–442, "Speech Recognition in Noisy Environments with the Aid of Microphone Arrays." Ingvar Claesson, et al., IEEE Transaction on Vehicular Technology, vol. 40, Feb. 1991, pp. 194–202, "A Multi–DSP Implementation of a Broad–Band Adaptive Beamformer for use in a Hands–Free Mobile Radio Telephone."

*Primary Examiner*—Scott A. Rogers
*Assistant Examiner*—Jerome Grant, II
*Attorney, Agent, or Firm*—Oblon, Spivak, McClelland, Maier & Neustadt

[57] ABSTRACT

A sound pick-up operation is carried out by means of at least four microphones positioned in a plane before the speaker, linear combinations are formed by additions and subtractions of the signals from these microphones and certain of these combinations are used as noise-only sources to process them by an adaptive vector filter to produce an estimation of the noise that is subtracted from the noisy signal.

9 Claims, 3 Drawing Sheets

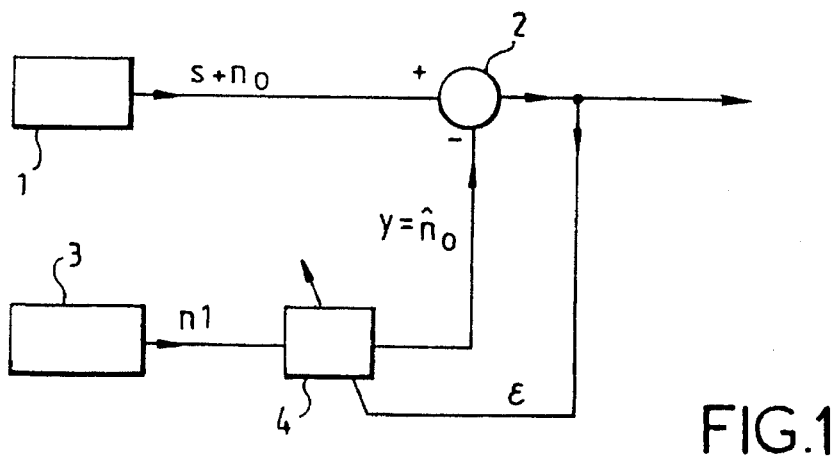
FIG.1
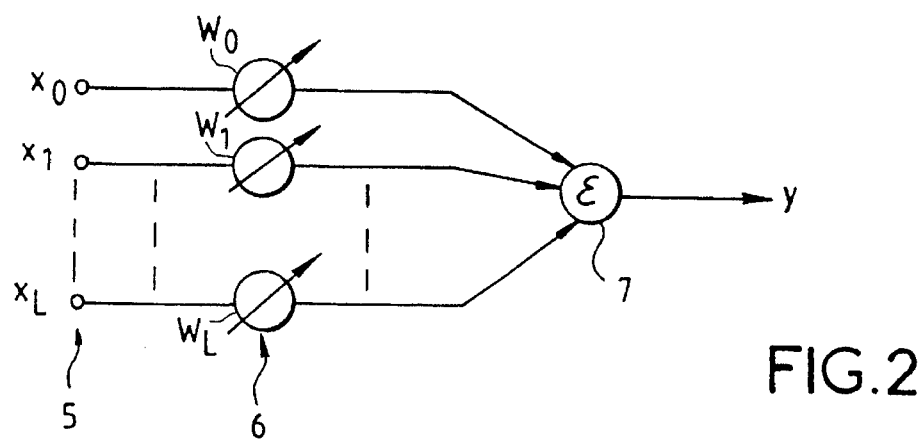
FIG.2
|  M1 | M2 |   |   |   |   |   | M8 |     |
|---|---|---|---|---|---|---|---|---|
| 0 | 0 | 0 | 0 | 0 | 0 | 0 | 0 |     |
| + | + | + | + | + | + | + | + | → S1 |
| + | + | + | + | − | − | − | − | → S2 |
| + | + | − | − | + | + | − | − |     |
| + | + | − | − | − | − | + | + |     |
| + | − | − | + | − | + | + | − |     |
| + | − | − | + | + | − | − | + |     |
| + | − | + | − | − | + | − | + |     |
| + | − | + | − | + | − | + | − | → S8 |
FIG.3

METHOD FOR VECTORIAL NOISE-REDUCTION IN SPEECH, AND IMPLEMENTATION DEVICE

BACKGROUND OF THE INVENTION

1. Field of the Invention

The present invention relates to a method for vectorial noise-reduction in speech and to an implementation device.

2. Description of the Prior Art

Known methods for the reduction of noise in speech use linear filtering. FIG. 1 shows a standard device for the implementation of a method such as this. This device comprises essentially a noise-ridden or noisy signal (speech signal) source 1 that is connected to the+ input of a subtractor 2. A source 3 of noise alone is connected via an adaptive filter 4 to the subtraction input of the subtractor 2. The output of the subtractor 2, which constitutes the output of the noise-reduction device, is furthermore connected to the control input of the filter 4 to send it a residual error signal $\epsilon$.

The source 3 constitutes a noise model, in the sense of a certain criterion, for example a least mean square criterion, this noise being subtracted adaptively from the noisy signal. The operating principle of this device relies on a postulate according to which the useful signal s, the noise $n_o$ affecting this signal, the noise model $n_1$ and the output signal y of the filter 4 are in a stationary state and that, furthermore, there is a decorrelation between s and $n_o$ and between s and $n_1$, and that there is a high correlation between $n_o$ and $n_1$.

The output signal is equal to:

$$\epsilon = s + n_o - y,$$

that is:

$$\epsilon^2 = s^2 + (n_o - y)^2 + 2s(n_o - y),$$

giving, for the power values:

$$E[\epsilon^2] = E[s^2] + E[(n_o - y)^2]$$

Since the output signal is not affected by the adaptive filtering, we have:

$$E \min[\epsilon^2] = E[S^2] + E \min[(n_o - y)^2]$$

The output of the filter 4 is adjusted so that Emin is minimized. This minimizing of the total output power leads to a reduction of the power of the noise and, consequently, to a maximizing of the signal-to-noise ratio.

At best, the following is obtained:

$$E[(n_o - y)^2] = 0,$$

giving $$E_{min}[\epsilon^2] = E[s^2]$$

with:

$$y = \hat{n}_o \text{ and } \hat{\epsilon} = \hat{s}$$

In other words, when the signal of the source 3 is not decorrelated from the signal of the source 1, we have:

$$\begin{aligned} E[\epsilon^2] &= E[(s+n_o)^2] + 2E[-y(s+n_o)] + E[y^2] \\ &= E[(s+n_o)^2] + E[y^2] \end{aligned}$$

and the minimization of the output power forces the adaptive weights of the filter 4 towards zero, and this forces $E[y^2]$ towards zero. This approach is well known to those skilled in the art. The adaptive filter 4 is conventionally of the LMS (least mean squares) type or else of the RLS (recursive least squares) type.

The chief defect of this known approach is the overriding need to have this noise source 3 physically available. This source may include a variable proportion of signals that do not have characteristics of noise only. The performance characteristics of the noise-reduction method are then considerably affected by this fact, as is shown by standard theoretical computations which shall not be entered into herein.

A first possible way of overcoming this defect would be to make use of "frequential diversity". This solution consists essentially in processing the noisy signal by DFT (discrete Fourier transform) and, on the basis of its power value, in producing the signal y to be subtracted therefrom by using the reverse discrete Fourier transform of this power value. This processing operation consists in splitting up the useful noisy signal into independent subbands, for example by Fourier analysis, and then in processing each subband independently to increase the size of the vector space of observation. This kind of cutting-up operation cannot be used for speech processing since it is known that the speech signal is not frequentially stationary and does not, statistically, occupy the same frequency bands (which is what happens, for example, with voiced structures).

Another approach would be to use temporal diversity. This approach too is not useful, for the stationary state of the vocal transmission is not physically realistic. At most, it is possible to observe a degree of stationary state on some tens of 25.6 ms frames (corresponding to 256 points of a signal sampled at 10 kHz) for stable vocal cores, but this stationary state would be reduced to a period equal to that of 1 to 3 frames for the plosives (sounds such as "t").

A third approach would be that of "spatial diversity" wherein several signal tapping (vector information tapping) points are distributed in space. The filtering would then be done as shown schematically in FIG. 2.

There is placed, before a speaker, a set 5 of (L+1) microphones which may be, for example, equally spaced out, the output signals of these microphones being referenced $x_o, x_1 \ldots x_L$. Each of these microphones is followed by a narrow-band adaptive filter, the entire set of filters being referenced 6, these filters being respectively referenced $W_0$, $W_1 \ldots W_L$. Their outputs are connected to a summator 7, the output of which constitutes that of the device.

$X_k$ designates any one of the input vectors, $W_k^T$ the transposed vector of the weight to be applied to the filter and $g_k$ the output scalar.

We have:

$$g_k = X^T_k W_k = W_k^T X_k$$

with $Wk = [W_o k, W_1 k, \ldots W_L k]^T$

At a given instant (determined for example by a sample-and-hold operation), there are L input signals available. The transmission of speech affects all the output signals of the microphones 5, the differences between these signals being due chiefly to the difference in the time of propagation between the speaker and the different microphones. In a manner that is known per se, the spatial processing operation consists in forming an antenna by the formation of conventional channels (generally by linear combinations of the signals of the microphones) to obtain the deflection, by phase-shifting (or by pure delay), of the directional lobe of the antenna thus formed. The limitations mentioned here above for the other known methods remain present.

SUMMARY OF THE INVENTION

An object of the present invention is a method for vectorial noise-reduction in speech that can be used to obtain a reference noise source showing the best possible correlation with the noise affecting noisy speech, this being achieved whatever the vocal content of the noisy speech, without particular constraints as regards the frequency or duration of the speech signal.

An object of the present invention also is a simple and inexpensive device for the implementation of this method.

The method according to the invention consists in carrying out a vectorial sound pick-up by means of at least four equally spaced out microphones positioned before the source of signals to be processed, forming linear combinations by additions and subtractions of the signals from said microphones in so as to obtain, the direction of the source, a major lobe of sensitivity, the sum of all the output signals of the microphones representing the noisy signal, each of the other combinations comprising as many subtractions as as additions of signals, and being used as sources of noise only and being processed by a vectorial adaptive filter to produce an estimate of the noise that is subtracted from the noisy signal.

BRIEF DESCRIPTION OF THE DRAWINGS

The present invention will be understood more clearly from the following detailed description of an embodiment, taken as a non-restrictive example and illustrated by the appended drawings, wherein:

FIGS. 1 and 2, already described hereinabove, are block diagrams of known noise-reduction and filtering devices;

FIG. 3 is an example of a table, according to the invention, of linear combinations of output signals of a set of eight microphones;

MORE DETAILED DESCRIPTION

The invention is described hereinbelow with reference to the reduction of noise in the vocal emission of a speaker placed in a noisy environment but it is clearly not limited to such an application and may be implented for the reduction of noise in the useful signals from any sound source that is assumed to be a point source, is located in a noisy environment, and may be mobile.

In the example described hereinabove, two sets of microphones are placed, before the speaker, at a usual distance from said speaker (a distance of 1 to 4 m for example). Each of these two sets comprises, for example, eight microphones that are aligned and equally spaced out with respect to one another. The spacing between neighboring microphones is, for example, of the order of some centimeters to about ten centimeters. For example, for a spacing d=10 cm, the maximum frequency processed is: fmax: C/2d, giving about 1.7 kHz, C being the speed of sound in the air. These two sets are arranged, for example, in the form of a cross. However, the number of microphones and their arrangement could be different. The number of these microphones may be, for example, four or another multiple of four for each set, and they may be positioned, for example, in the shape of a "V" or a circle. Preferably, these two sets are coplanar.

The eight microphones of each of these two sets are referenced M1 to M8. Their output signals are combined with each other according to eight different combinations. One of these combinations (the first line of the table of FIG. 3) gives a resultant signal S1, and it is the combination corresponding to the addition of all these signals. Each of the other seven combinations comprises four additions and four subtractions and respectively gives the resultant signals S2 to S8. Thus, for example, the combination of the second line of the table of FIG. 3 corresponds to the addition of the signals from M1 to M4, the signals from M5 to M8 being all subtracted, hence $S2=(M1+M2+M3+M4)-(M5+M6+M7+M8)$.

Figure 4:
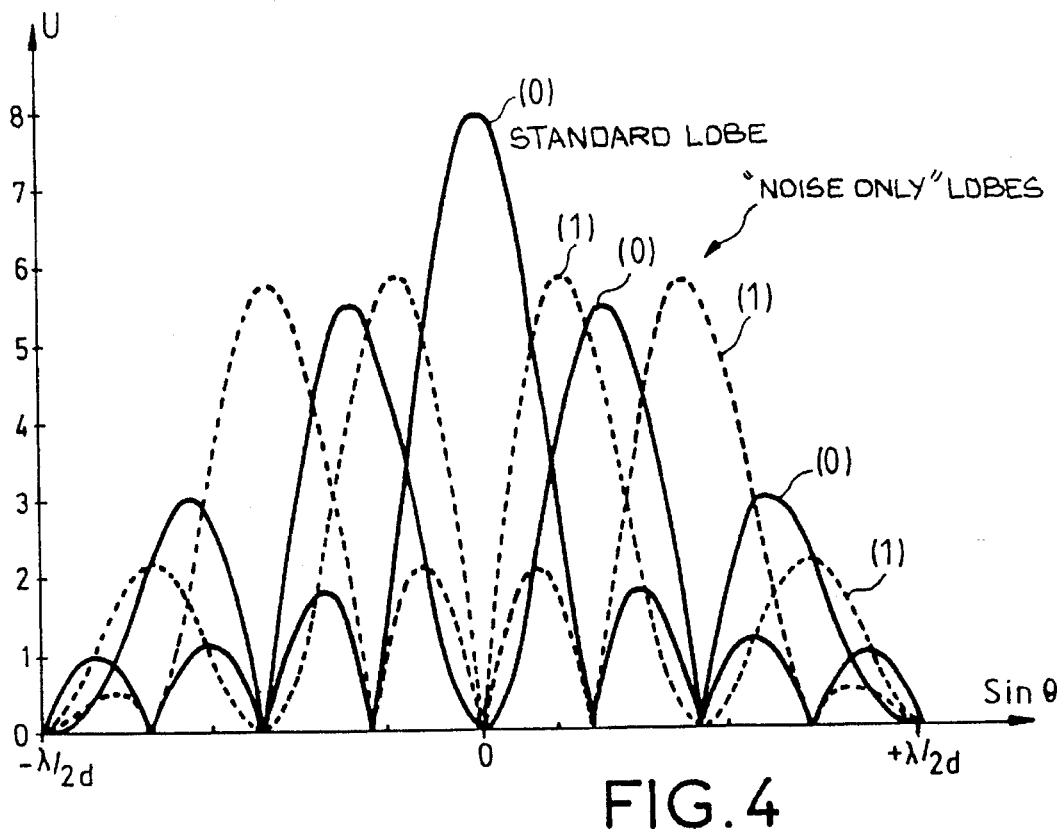
FIG. 4 shows the first four graphs of directivity of a set of eight microphones positioned, according to the invention, so as to face a speaker.

It must be noted that these eight combinations are orthogonal (i.e. they form part of a base of orthonormal functions such as a Haar decomposition base). The signal S1 corresponds to a directional major lobe of a standard channel. The other signals S2 to S8 may be considered to be those produced by "noise only" channels since they have a zero in the direction of the major lobe. FIG. 4 shows the graph giving the arbitrary value U of the directional lobe at the different outputs S1 to S8 defined here above, for each of the two sets of microphones, as a function of the angle formed between the perpendicular to the plane of the two sets of microphones and the different directions of measurement. The x-axis values are graduated in values of $\lambda/d$, $\lambda$ being the velocity of sound and d the spacing between the microphones.

To simplify the explanations, it is assumed that the microphones used are omnidirectional. If directional graphs are taken into account, the explanations given here remain valid provided, of course, that all the microphones are identical or that their disparities are compensated for (by complex weighting in amplitude and phase).

To implement the method of the invention, the set of microphones is first of all aimed at the sound source (the speaker). This aiming may make use of any known and appropriate method, for example a wide-band super-resolving method such as AR, Capon, Music etc to determine the elevation angle and relative bearing of the sound source.

It is important to note that the method of the invention requires no computation for the formation of the "noise only" channels. The combinations described here above with reference to the table of FIG. 3 actually involve only simple serializing operations ("+" combinations) and the use of inverters (for the "−" combinations).

The output signals from all the microphones are sampled synchronously. Hence, signals that have all been picked up at the same instant are available. The stationary state of the noise affecting all these signals is thus ensured.

Although, from the spatial viewpoint, there is a left/right ambiguity that remains with respect to the speaker (the lobes of the microphones are symmetrical with respect to the middle of the array, as is the case with image lobes of antenna arrays), this ambiguity does not affect the working of the noise-reduction device since the signals prepared are, firstly, the sum signal of all the microphone signals and, secondly, the sum signals of the "noise" channels. The position of the speaker is determined independently of this ambiguity.

The weights of the different filters can be computed by one of the super-resolving methods shown in the following table:

| | W | output power |
|---|---|---|
| Conventional formation | $\frac{1}{N} D(\theta)$ | $D^+(\theta) \cdot \Gamma x \cdot D(\theta)$ |
| Capon (ML) | $\dfrac{\Gamma^{-1} \cdot D(\theta)}{D^+(\theta) \cdot \Gamma_x^{-1} \cdot D(\theta)}$ | $[D^+(\theta) \cdot \Gamma_x^{-1} \cdot D(\theta)]^{-1}$ |
| Lagunas | $\dfrac{\Gamma^{-1} \cdot D(\theta)}{[D^+(\theta) \cdot \Gamma_x^{-2} \cdot D(\theta)]^{-2}}$ | $D^+(\theta)\Gamma^{-1} \cdot D(\theta)/(D^+(\theta) \cdot \Gamma^{-2} \cdot D(\theta)$ |
| AR (ME M) | $\Gamma_x^{-1} E$ | $(E^+ \cdot \Gamma_x^1 E) [D^+(\theta) \cdot \Gamma^{-1} E]^2$ |
| Goniometry Music | $\Gamma_x^{-1} \cdot V$ | $\lambda_k/|D^+(\theta)V|^2$ |

W is the vector corresponding to the weights of the filters, $D(\theta)$ and $D^+(\theta)$ are respectively the conventional vector and its conjugate transpose, $\Gamma_x$ is the interspectral matrix, $\Gamma_x^+$ and $\Gamma_x^{-1}$ are respectively the conjugate transpose of $\Gamma_x$ and the converse (or pseudo-converse) of $\Gamma_x$, the parameters $\lambda_k$ and V designate the smallest eigenvalue of $\Gamma_x$ and the associated eigen-vector and E is the vector constituted by the power of the noise for its first component (the other components being equal to zero).

The generic term "super-resolving" indicates simply that the methods in question may resolve (discriminate) two sources separated by a distance of less than $\lambda/L$ (L being the total length of the physical antenna formed by the series of eight aligned microphones and $\lambda$ being the wavelength.

The processing of the different channels is a wide-band processing. The matrix of the covariances is then an interspectral matrix (matrix of correlation of the observation vectors). The 2D array of microphones arranged in a cross enables the assessing of the elevation angle and relative bearing of the sound source through detection of the maximum of the function: $\lambda_k/|D^+(\theta)V|^2$ (FIG. 4).

This makes it possible to servolink the array to the position of the speaker. This servolinking is done by the electronic aiming (as with tracking radar antennas) of the array of microphones by varying the phase-shift applied to their respective signals.

When this aiming is done, a binary conversion (FIG. 3) is applied to the signals coming from the microphones. This gives, firstly, a noisy signal channel and, secondly, seven "noise only" channels (in the case of eight microphones). A vector processing (of the LMS or RLS type for example) enables the filtering of this estimated value of the noise. The subtraction of this estimated value from said noisy signal enables an adaptive noise-reduction operation to be carried out.

Vector processing by the least mean squares method and, in an equivalent way, the search for the optimum filtering, are generally carried out by iterative gradient-seeking techniques.

When the signals from the microphones are sampled at the period Te with $s(k)=s|kTe|$, the adaption algorithm of the deterministic gradient is:

$$\begin{aligned} W(k+1) &= W(k) - \frac{\mu}{2} \nabla E(k) \\ &= W(k) + \mu\{E[s(k) \cdot X(k)] - \Gamma_x W(k)\} \\ &= W(k) + \mu E[s(k)X(k) - X(k)X^T(k)W(k)] \\ &= W(k) + \mu E[e(k)X(k)] \end{aligned}$$

In these equations, $\mu$ designates the incrementation step of the algorithm which is positive and constant. On the value of this step depend the speed, the residual variance and the closeness of convergence of the algorithm. An advantageous algorithm for the implementation of the vector processing operation is the algorithm of the stochastic gradient, also called the LMS algorithm. This algorithm uses a stochastic estimation of the gradient, so that the filtering vector is adjusted in accordance with the following expressions.

$$W(k+1)=W(k)+\mu e(k)X(k)$$

$$e(k)=s(k)-W^T(k).X(k)$$

The expressions involved here are real expressions since the speech signals are considered in baseband, without the need for a complex demodulation.

The LMS algorithm enables the minimizing of the root mean square error of an adaptive device with respect to a reference ("noise only") signal, the value of which is known at each sampling instant. This algorithm makes it possible to obtain, on an average, the optimum solution:

$$W_{opt}=\Gamma_x^{-1}.E[s(t)X(t)]$$

with a variance proportional to the incrementation step $\mu$ and to the power of the noise collected by the microphones. This algorithm is advantageous because it shows high stability but it is possible, of course, to use other algorithms, for example the recursive least squares algorithm which has a higher convergence speed. However, a compromise must be sought between speed of convergence and residual variance of the error of estimation.

Figure 6:
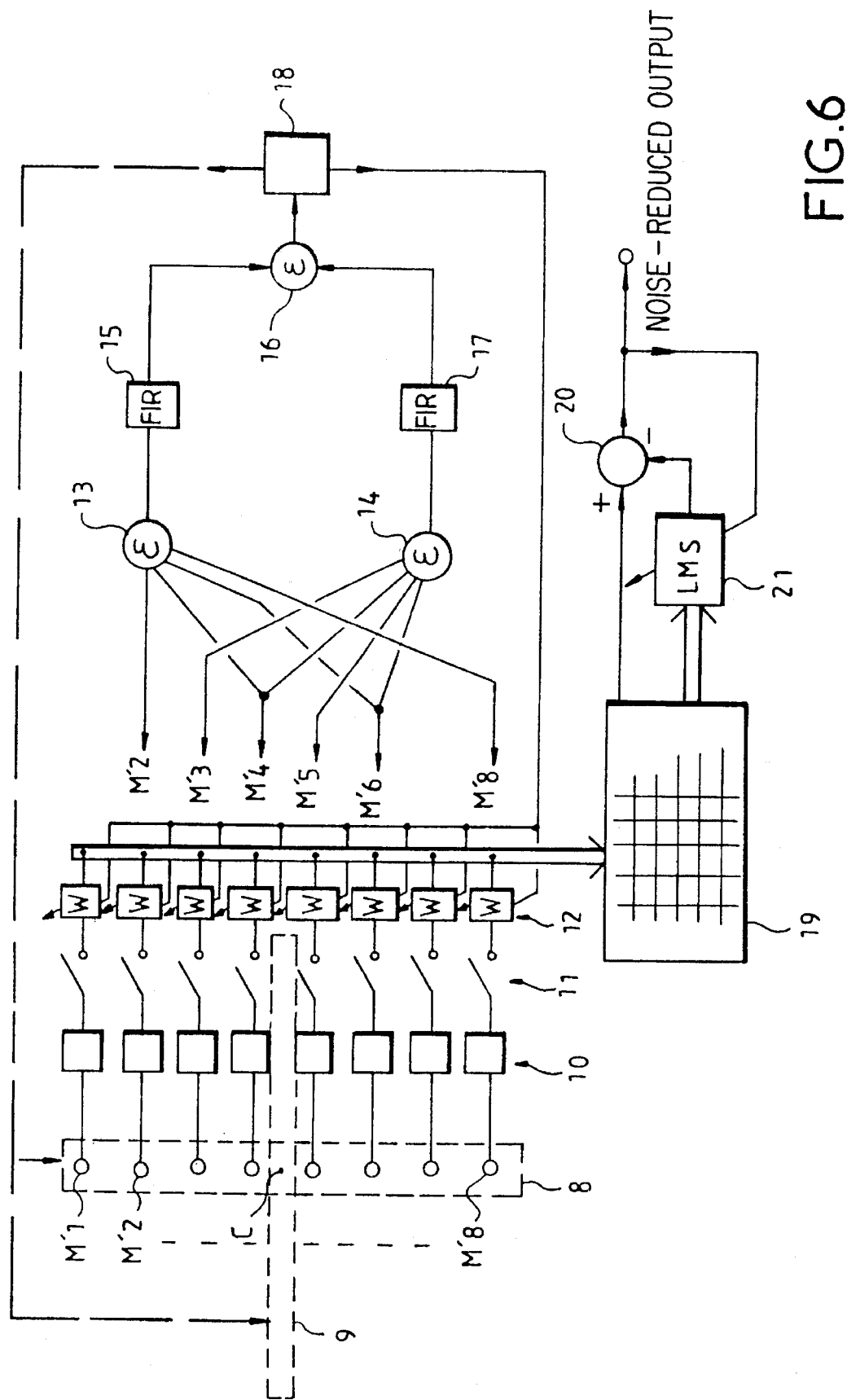
FIG. 6 is a block diagram of a noise-reduction device according to the invention.

FIG. 6 gives a schematic view of an exemplary embodiment of a device for the implementation of the method according to the invention.

Reference 8 in this figure shows a set of eight equally spaced out microphones M'1 to M'8. The other set 9, indicated by means of dashes, is positioned crosswise with respect to the first set, and is coplanar with it. The connections of the microphones of this second set are identical to those of the microphones of the set 8 up to the locating device, and have not been shown for the clarity of the drawing.

Each of the microphones of the set 8 is followed by a preamplifier (the set of preamplifiers being referenced 10), a sampling device (the set of sampling devices being referenced 11) and a non-recursive, transversal filter (the set of such filters being referenced 12). The outputs of the microphones M'2, M'4, M'6 and M'8 are connected to a summator 13. The outputs of the filters of the set 12 pertaining to the microphones M'3 to M'6 are connected to another summator 14.

The output of the summator 13 is connected, through a compensating filter 15 (for example of the FIR type) to a first input of a summator 16, and the output of the summator 14 is connected, through a filter 17, identical to the filter 15, to a second input of the summator 16.

The output of the summator 16 is connected to a device 18 for the locating of the speaker. This device 18 for the servocontrol, in elevation angle and relative bearing, of the two sets of microphones 8 and 9, is of the super-resolving type working according to one of the principles mentioned here above.

The sampling devices 11 of the microphones M'1 to M'8 are furthermore connected to a binary conversion combiner device 19 of the type described hereinabove with reference to FIG. 3. The "major lobe" output (combination comprising only additions) of the combiner 19 is connected to the (+) input of a subtractor 20. The other seven "noise only" outputs are connected through an adaptive filter 21 to the (−) input of the subtractor 20. The filter 21 is, for example, a transversal filter, the coefficients of which are recomputed at each speech frame (1 frame=25.6 ms for example) so as to minimize the noise at the output of the subtractor 20.

The two sets of microphones 8 and 9 carry out a double spatial sampling of the vocal emission of the speaker. At the outputs of the summators 13 and 14, there are formed two physical antennas with the same major lobe but with two frequencies separated by an octave. The compensating filters 15 and 17 correct the dispersions between the frequencies at the extreme points of the sound spectrum received. The signals coming from the two filters 15, 17 are added up at 16. At the output of 16, therefore, there is obtained a constant directional lobe (corresponding to the major lobes of the sets 8 and 9). This is true when the normal to the plane formed by the sets 8 and 9 (the microphones are likened to coplanar points), passing through the point of intersection C of the sets 8 and 9, is directed towards the speaker (also taken to be a point). When this is not the case, at least one of the two major lobes is offset with respect to the center (C) of the corresponding directivity pattern, and the output signal of 16 is affected thereby (loss of power). The servocontrol/locating device 18 then orients the plane of microphones, in a manner known per se in terms of elevation angle and/or relative bearing, to recover the maximum of a functional at the output 16.

Figure 5:
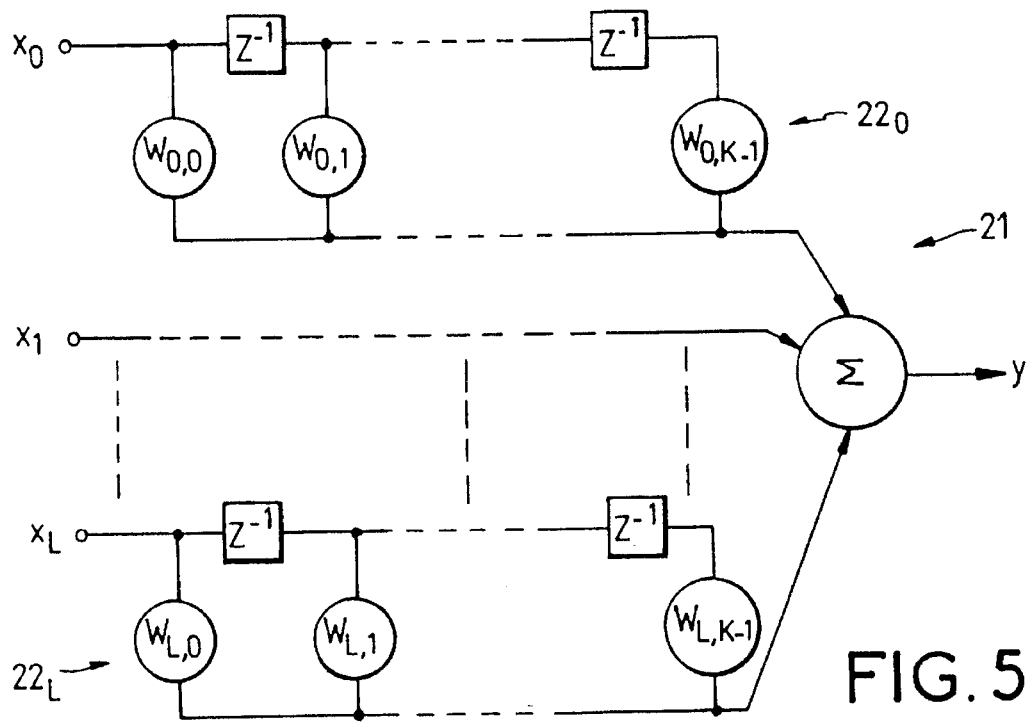
FIG. 5 is a block diagram of a wide-band filtering device used in the device of the invention.

FIG. 5 shows a simplified view of an exemplary embodiment of the wide-band adaptive filter 21 of FIG. 6. For each of (L-1) channels of microphones $x_o$ to $x_L$, this filter comprises an elementary filter, respectively referenced $22_o$ to $22_L$. Each of these elementary filters comprises, in a manner known per se, k cascaded processing blocks. Each processing block comprises essentially a delay cell $Z^{-1}$ (for example in the form of a buffer register) and a convolution cell $W_{i,j}$ (i ranging from o to L for the channels $22_o$ to $22_L$ and j ranging from o to k-1 in each channel). The first processing block ($W_{o,o}$ to $W_{L,o}$) does not include any delay cell. The outputs of the channels $22_o$ to $22_L$ are connected to a parallel adder 23. The weights of the different processing blocks (coefficients affecting the delayed discrete values processed by each processing block) are servolinked to the output signal of the adder 20.

What is claimed is:

1. A method for vectorial noise-reduction for a source of sound signals that is substantially a point source, comprising the steps of:

vectorially picking up sound signals by means of at least four equally spaced out microphones positioned in a plane before the source of sound signals forming linear combinations from the sound signals by additions and subtractions of the sound signals from said microphones;

wherein the sum of all the sound signals from the microphones represents the noisy signal each of the other linear combinations of sound signals comprises as many subtractions as additions of the sound signals and represent noise only signals;

processing the linear combinations of the sound signals from the microphones that have as many subtractions as additions with a vectorial adaptive filter to produce an estimate of the noise of the noisy signal; and subtracting said estimate of the noise of the noisy signal from the noisy signal.

2. A method according claim 1, wherein the vectorial noise-reduction implements an LMS or RLS type of algorithm.

3. A method according to claim 1, wherein the microphones are arranged in two orthogonal and coplanar sets, the normal to the plane thus formed being pointed towards the source of the sound signals to be processed.

4. A method according to claim 3 wherein, each set of microphones forms first and second physical antennas having the same directional major lobe with two frequencies separated by an octave and further comprising the step of adding the signals from the first and second physical antennas to form a servocontrol signal and using the servocontrol signal to servocontrol the the physical antenna's orientation in terms of elevation angle and bearing and plane in which the microphones are positioned in relation to the source of sound signals.

5. A method according to claim 1, wherein the signals of all the microphones are sampled synchronously.

6. A method according to any of the claims 4 or 5, wherein the orientation, in terms of elevation angle and relative bearing, of the plane in which the microphones are positioned in relation to the source of sound signals is determined by a super-resolving method.

7. A method according to claim 6, wherein the super-resolving method is chosen from among the CAPON, LAGUNAS, AR or MUSIC methods.

8. A method for vectorial noise-reduction in a source that is substantially a point source, comprising at least one set of at least eight equally spaced out microphones, each followed by an amplifier, a sampling device, the sampling devices being all synchronous and connected to a binary conversion matrix comprising serializing connections and inverters, a first one of these outputs corresponding to the serializing of all the inputs, each of these other outputs corresponding to a different combination of of serializing operations and input inversions, the first output of this combiner device being connected to the (+) input of a subtractor and the others being connected via an adaptive filter to the (−) input of the subtractor.

9. A device according to claim 8, comprising two orthogonal and coplanar sets of microphones, the outputs of the sampling devices being each connected, via a filter, for each of the two sets, as far a first part of these outputs is concerned, to first summator and, as far as a second part of these outputs is concerned, to a second summatot, each of the two summators being connected via a compensating filter to another summator, the output of which is connected to a device for the positional servocontrol of the plane in which the microphones are positioned.

* * * * *